Feb. 22, 1949.  K. CLARK ET AL  2,462,468
SPECTACLE SIGHTING DEVICE
Filed Sept. 13, 1945  3 Sheets-Sheet 1

INVENTOR.
Kendall Clark
BY Kenneth O. Sisson

Feb. 22, 1949.   K. CLARK ET AL   2,462,468
SPECTACLE SIGHTING DEVICE

Filed Sept. 13, 1945   3 Sheets-Sheet 2

INVENTOR.
Kendall Clark
BY Kenneth O. Sisson

Feb. 22, 1949.   K. CLARK ET AL   2,462,468
SPECTACLE SIGHTING DEVICE
Filed Sept. 13, 1945   3 Sheets-Sheet 3

INVENTOR.
Kendall Clark
BY Kenneth O. Sisson
Spencer Hardman and Fehr
attorneys

Patented Feb. 22, 1949

2,462,468

UNITED STATES PATENT OFFICE 2,462,468

SPECTACLE SIGHTING DEVICE

Kendall Clark and Kenneth O. Sisson, Oakwood, Ohio, assignors to General Motors Corporation, Dayton, Ohio, a corporation of Delaware Application September 13, 1945, Serial No. 616,134

2 Claims. (Cl. 88—2.4)

1

This invention in one of its applications relates to a spectacle sighting device which may be used on aeroplanes or elsewhere.

Sighting devices have been used to determine the location of ships, aeroplanes and other vehicles. They are also used for air bombing and the direction of gun fire. Most of these sighting devices when in use require the entire attention of the operator and the use of both hands for a continuous period of considerable length. Many are extremely complicated.

It is an object of our invention to provide a sighting device for air bombing and other purposes which requires less attention and particularly requires attention only for short periods of time when actually sighting.

It is another object of our invention to provide a sighting device which leaves both hands free during bombing and other sighting.

It is another object of our invention to provide a sighting device which may be used while piloting a plane.

It is another object of our invention to provide an extremely simple, light weight sighting device which is sufficiently accurate for low altitude bombing and which may be readily adjusted to provide various sighting angles.

It is still another object of our invention to provide a sighting device attached to a pair of spectacles to allow wide angle vision and in which the sighting line is pre-set and does not require sighting upon the target excepting for an instant while making a bombing run or other observation.

Briefly, to attain these objects we provide a pair of adjustable spectacles which can be readily adjusted to properly fit the eyes of any person. Pivotally connected to the spectacles is an illuminated ball type level indicator. Also connected to the spectacles is a focusing lens covering slightly more than half of an eye and a reflecting system by which the image of the level indicator is transmitted to the lens and the eye. The level indicator is made adjustable on its pivot and is connected to the reflecting system so that it may be adjusted to provide lines of sight at various angles to the horizontal.

Further objects and advantages of the present invention will be apparent from the following description, reference being had to the accompanying drawings, wherein a preferred form of the present invention is clearly shown.

In the drawings:

Fig. 1 is a front view of our sighting device including the adjustable spectacles;

2

Figures 1, 2:
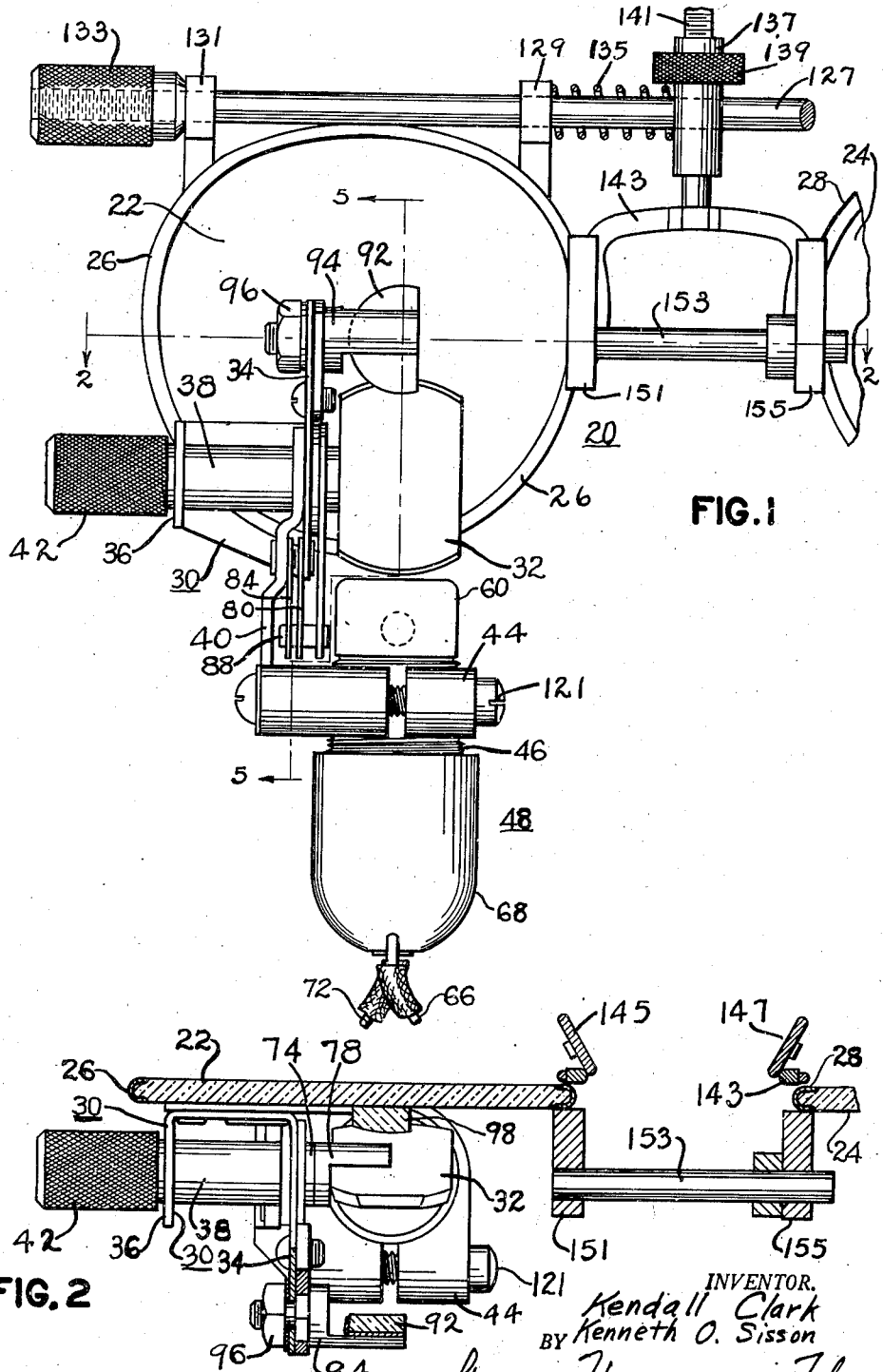
Fig. 2 is a sectional view taken along the line 2—2 of Fig. 1.
Figures 3, 4:
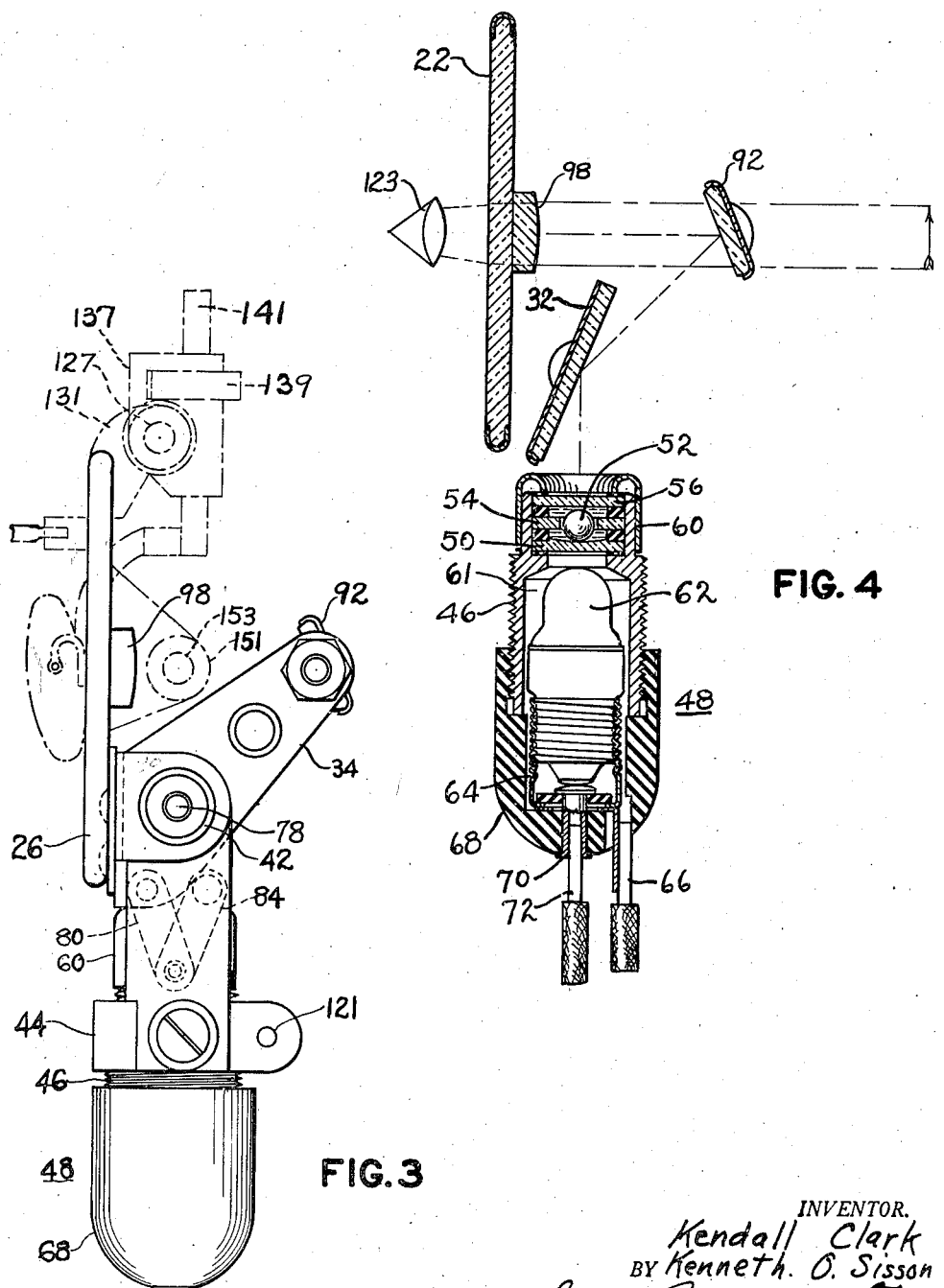
Fig. 3 is a side view of the device shown in Fig. 1 with portions of the spectacles shown in dot and dash lines.
Fig. 4 is a sectional view, partly diagrammatic, showing the level indicator, the reflectors and the lens.

Referring now to the drawings, there is shown a pair of spectacles 20 including the eyeglasses 22 and 24 supported within the rims 26 and 28. The rim 26 is provided with a bracket 30. This bracket 30 carries a shaft 78 (Fig. 3) provided with a mirror 32 at one end which over-hangs the bracket 30 so that the mirror is located beneath the level of the eye adjacent the bottom portion of the eyeglass 22. On the shaft 78 between the arm 34 and the ear 36 of the bracket 30 there is provided a hub 38 which is fixed to the lever 40. This hub 38 is rotatably mounted upon the shaft but it can be held in any adjustable position by the knurled finger nut 42 which is threaded onto the end of the shaft 78 for clamping the hub 38 and lever 40 between the arm 34 and the ear 36. This knurled nut 42, when tightened, tightens the shaft 78 and holds the hub 38, the lever 40 as well as the mirror 32 in a fixed relationship to the spectacles.

At its lower end the lever 40 carries a clamping block 44. This clamping block 44 is threaded so as to receive the threaded ball housing 46 of the illuminated level indicator 48. The threaded ball housing 46 at its upper portion is recessed to support a disc-shaped ball seat 50 preferably of glass or some similar transparent material having a concave spherical upper surface and a plane frosted lower surface. A polished steel ball 52 rests on the spherical surface and is surrounded by a ring-shaped ball retainer 54 having a concentric aperture therein slightly larger than the maximum diameter of the ball 52. This ball retainer 54 may be silvered on its bottom face and on the inside of the aperture so that no light may pass through it. Spaced by a seal ring from the ball retainer 54 and the ball 52 is the ball cover 56 in the form of a plane polished transparent glass disc. The chamber containing the ball 52 is filled with a light oil and sealed by the spacer rings provided on either side of the glass disc-shaped members 50, 54 and 56 within the ball housing 46. A cap 60 fits tightly on the top of the ball housing 46 and holds the members 50, 54 and 56 in place.

The ball housing 46 is provided with a lower chamber 61 containing a light bulb 62 provided with an integral lens. The light bulb illuminates the ball and ball chamber and since the ball and ball retainer are opaque, the space between the ball 52 and the edges of the aperture in the ball retainer will be brilliantly illuminated while the remainder is dark. If the ball is exactly in a concentric position it indicates that the axis of the indicator assembly is exactly vertical. It will be readily apparent, if the ball is not concentric with the aperture, since there will be no uniform ring of light around the ball. It has been found that the eye is particularly sensitive to this arrangement and it is very easy for most persons to hold the indicator so that its axis is truly vertical. The bulb 62 is threaded into a metal socket 64 provided with a terminal connected to the conductor 66. This socket is supported in the bulb socket cap 68 of insulating material which carries the center contact member 70 connected to the conductor 72. The center contact of the light bulb 62 contacts this center contact 70.

The mirror 32 is supported directly over the ball 52 by the bracket 30. The enlarged end of the shaft 78 carrying the mirror 32 is provided with a key projection 74 keyed to a slotted lever 76 which therefore rotates with the mirror and the shaft 78. A link 80 is pivotally connected to the bracket 30 by the rivet 82. A second link 84 of equal length is pivoted to the lever 40 by the rivet 86. The lower ends of these two links 80 and 84 are connected by a pin 88 which rides in the slot 90 in the lever 76. It should be noted that the two equal length links 84 and 80 serve to keep the slotted lever 76 exactly equally spaced between their rivets 82 and 86 no matter what the distance is between these rivets.

The extreme end of the arm 34 carries a semicircular mirror 92 which is mounted upon a stud 94 fastened to the arm by the nut 96. This mirror 92 is mounted directly in front of a similarly shaped convex lens 98 which is fastened to the eyeglass 22 so that its axis is directly in front of the eye. The cut-off part of its circle permits some vision of the eye past the lens 98 and the mirror 92. The level indicator 48 is threaded up or down within the clamping block 44 until the ball is brought exactly in the focal point of the lens 98. The clamping screw 121 is then tightened to prevent accidental change of adjustment of the position of the level indicator.

Figure 5:
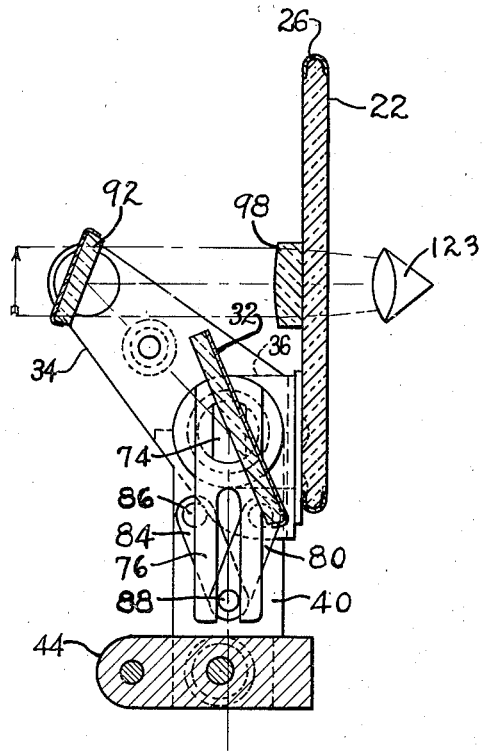
Fig. 5 is a sectional view taken along the line 5—5 of Fig. 1 with the device set for sighting directly horizontal.
Figure 6:
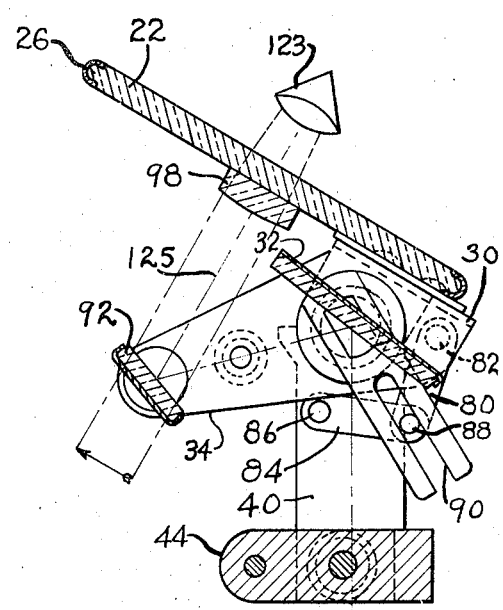
Fig. 6 is a sectional view also along the line 5—5, but with the device adjusted for looking downward at an angle of 60 degrees from the horizontal.

To set the sighting line to any angle the finger nut 42 is loosened. After this is done the level indicator may be pivoted on the axis of the shaft 78 to any desired angle within the limit of about 90 degrees. In Fig. 5 the lever 40 is positioned to hold the level indicator exactly vertical providing an exactly horizontal line of sight from the eye 123 through the lens 98 to the mirror 92. In Fig. 6 the lever 40 and the level indicator is held in the same position, but the arm 34 and the spectacles are pivoted with respect to the lever 40 so that the line of sight 125 from the eye 123 to the mirror 92 is 60 degrees downward from the horizontal.

In order to keep the image of the level indicator 48 reflected directly through the lens 98 to the eye 123 it is necessary that the position of the mirror 32 be changed for every change of sighting angle. The amount of angular movement of the mirror 32 required to do this is just half the amount of relative movement between the eyeglass 22 and the level indicator 48. This amount of movement is provided automatically by the equal length links 80 and 84, together with the slotted lever 76. When the eyeglass 22 was moved relative to the level indicator through an angle of 60 degrees in changing the setting from that shown in Fig. 5 to that shown in Fig. 6, the slotted lever 76 and the mirror 32 was automatically rotated through an angle of 30 degrees. Through this simple arrangement the line of sight from the eye 123 through the lens 98 to the mirror 92, thence to the mirror 32, thence to the ball 52 and the level indicator 48, is always preserved automatically no matter what the angular adjustment may be.

To make it possible for different persons to use the sight without changing spectacles, the spectacles are made adjustable. For this purpose the top of the rim 28 has fastened to it a rod 127 which threads through the ears 129 and 131 extending from the top of the rim 26. A thumb screw 133 is threaded onto the end of the rod 127 and may be adjusted to move the eyeglass 22 toward or away from the eyeglass 24. A light coil spring 135 is threaded onto the shaft 127 between the ear 129 and a nose supporting block 137. This keeps the ear 131 against the thumb screw 133 in all positions of adjustment. The ear 151 carries a slide rod 153 which slides through an aperture in the ear 155 to keep the eyeglasses 22 and 24 in alignment. The nose supporting block 137 is apertured from top to bottom to receive a threaded shaft 141 which is adjusted by a thumb nut 139 which is lodged in a horizontal slot provided in the nose adjusting block 137. The bottom of this threaded shaft 141 is fastened to a yoke 143 carrying the nose pads 145 and 147. By this arrangement the thumb screw 139 may be turned to raise or lower the nose pads 145 and 147 relative to the eyeglass 22 and 24 and the lens 98 so that the lens 98 can be positioned directly on the same horizontal level as the eye while the thumb screw 133 can be adjusted to permit the vertical axis of the lens 98 to be positioned directly in front of the eye in the vertical plane.

Figure 7:
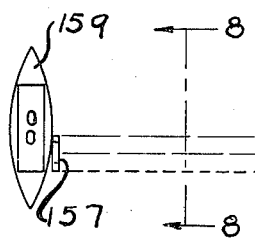
Fig. 7 is a diagrammatic view illustrating certain optical principles embodied in the device and inherent in its use.
Figure 8:
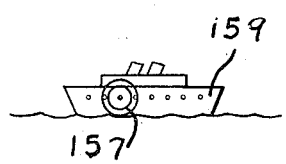
Fig. 8 is a view of the apparent image superimposed upon the object by the level indicator when level.
Figure 9:
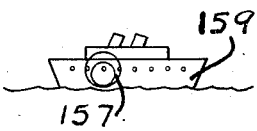
Fig. 9 is a view of the apparent image superimposed on an object by the level indicator when it is not held level.

The eyeglass 24 is without any lens corresponding to the lens 98. This eyeglass may be perfectly plain if the wearer needs no optical correction for normal vision. The eye which looks through the glass 24 then has free vision of any sighting objective or bombing target. In the other eye, which looks through the glass 22, two images are superimposed. As shown in Fig. 7, the eye 123 receives the light rays in ring-shaped pattern which emanate from the level indicator 48 (Fig. 4) and are reflected by the mirrors 32 and 92 and are then collimated by the lens 98 which is a convex collimating lens. The collimating lens 98, which covers about 60% of the eye, transmits only parallel rays of light to the eye 123. This makes the apparent image 157 of the ring of light appear as if it were fixed upon an object in the distance, for example, a ship 159. The object in the distance, such as for example, the ship 159, is viewed alongside the cut-away portions of the lens 98 and the mirror 92, as indicated by the heavy dotted line in Fig. 7. This causes the apparent image 157 of the ring of light to appear as if it were superimposed upon the object, such as the ship 159, as shown in Figs. 8 and 9. Although part of the lens 98 and the mirror 92 is cut away, nevertheless, a complete ring image is formed in the eye due to the inherent properties of the convex lens. This will determine the direction of view of both eyes relative to the level indicator 48 and when the head of the wearer and the spectacles are so positioned as to hold the ball 52 directly in the center of the aperture of the ball retainer 54 the axis of the level indicator 48 will be exactly vertical and the line of sight will be accurately determined. As long as the wearer of the spectacles holds the level indicator directly vertical and keeps a portion of the vision of one eye directed onto the illuminated ring surrounding the ball 52, while keeping the eyes searching for the target, the bomb may be released when the target comes directly into the field of vision. If the angle has been properly set the bomb will strike the target.

The wearer of the spectacles, however, is free to turn his eyes in other directions at any time and can turn his head freely to look in other directions. He can pilot a plane or perform other duties. It is only necessary at the exact instant of sighting to have the light ring around the ball concentric and to view both the light ring surrounding the ball 52 and the target or object of sighting to use the sighting device. Both hands are always free except when adjusting the sighting device to the desired angular position. Furthermore, the head is much more stable than the hands and naturally compensates for the movement of the remainder of the body, such as would occur in the rolling of a ship or the bouncing of a plane. For this reason the head can hold the spectacle sighting device much more steady than a hand-held sighting device, thereby providing a natural inherent stabilization.

Fig. 7 is a diagrammatic view illustrating certain optical principles embodied in the device and inherent in its use;

Fig. 8 is a view of the apparent image of the level indicator when level superimposed on an object; and Fig. 9 is a view of the apparent image of the level indicator when not level superimposed on an object.

While the form of embodiment of the invention as herein disclosed, constitutes a preferred form, it is to be understood that other forms might be adopted, as may come within the scope of the claims which follow.

What is claimed is as follows:

1. A sighting device for sighting at various measurable angles relative to the vertical including spectacles adapted to rest upon the nose, one of the eyepieces of the spectacles being provided with a small segmental collimating lens positioned so that the vision is split and the lens is in the path of a substantial portion of the directly forward vision field of one eye but leaves a substantial portion of the directly forward vision field free of the lens, the spectacles having a forwardly extending bracket, mirror means mounted upon said bracket and having a portion located directly in front of said collimating lens, a level indicating means pivotally mounted upon said bracket, means connecting the bracket and the level indicating means with the mirror means to move the mirror means to reflect light from the level indicating means to the collimating lens.

2. A sighting device for sighting at various measurable angles relative to the vertical including spectacles adapted to rest upon the nose, one of the eyepieces of the spectacles being provided with a small segmental collimating lens positioned so that the vision is split and the lens is in the path of a substantial portion of the directly forward vision field of one eye but leaves a substantial portion of the directly forward vision field free of the lens, the spectacles having a forwardly extending bracket with a forwardly extending arm, a first mirror positioned in front of and in the path of rays collected by the collimating lens and being mounted upon said arm, said mirror being restricted in area so it will not obstruct the free field of vision, a second arm pivoted to said bracket, a level indicator fixed to said second arm, a second mirror pivotally mounted upon said bracket, means connecting said second arm and said bracket with said mirror for moving the second mirror as the second arm is pivoted relative to the bracket for reflecting rays from the level indicator to the first mirror, said first mirror being positioned at the angle required to reflect the rays from the second mirror to the collimating lens.

KENDALL CLARK.
KENNETH O. SISSON.

REFERENCES CITED

The following references are of record in the file of this patent:

UNITED STATES PATENTS

| Number | Name | Date |
|---|---|---|
| 353,406 | Gurley | Nov. 30, 1886 |
| 444,495 | Johnston | Jan. 13, 1891 |
| 1,851,579 | Hixon | Mar. 29, 1932 |
| 1,877,459 | Hayes | Sept. 13, 1932 |
| 2,088,597 | Hegenberger et al. | Aug. 3, 1937 |
| 2,316,466 | Storer | Apr. 13, 1943 |
| 2,352,644 | Linderman, Jr., et al. | July 4, 1944 |
| 2,389,428 | Glasser | Nov. 20, 1945 |
| 2,410,667 | Luboshez | Nov. 5, 1946 |